Jan. 28, 1941.   J. M. McDONNELL   2,229,983
STATISTICAL CARD COMPARING MACHINE
Filed Dec. 21, 1939   7 Sheets-Sheet 2
FIG. IA
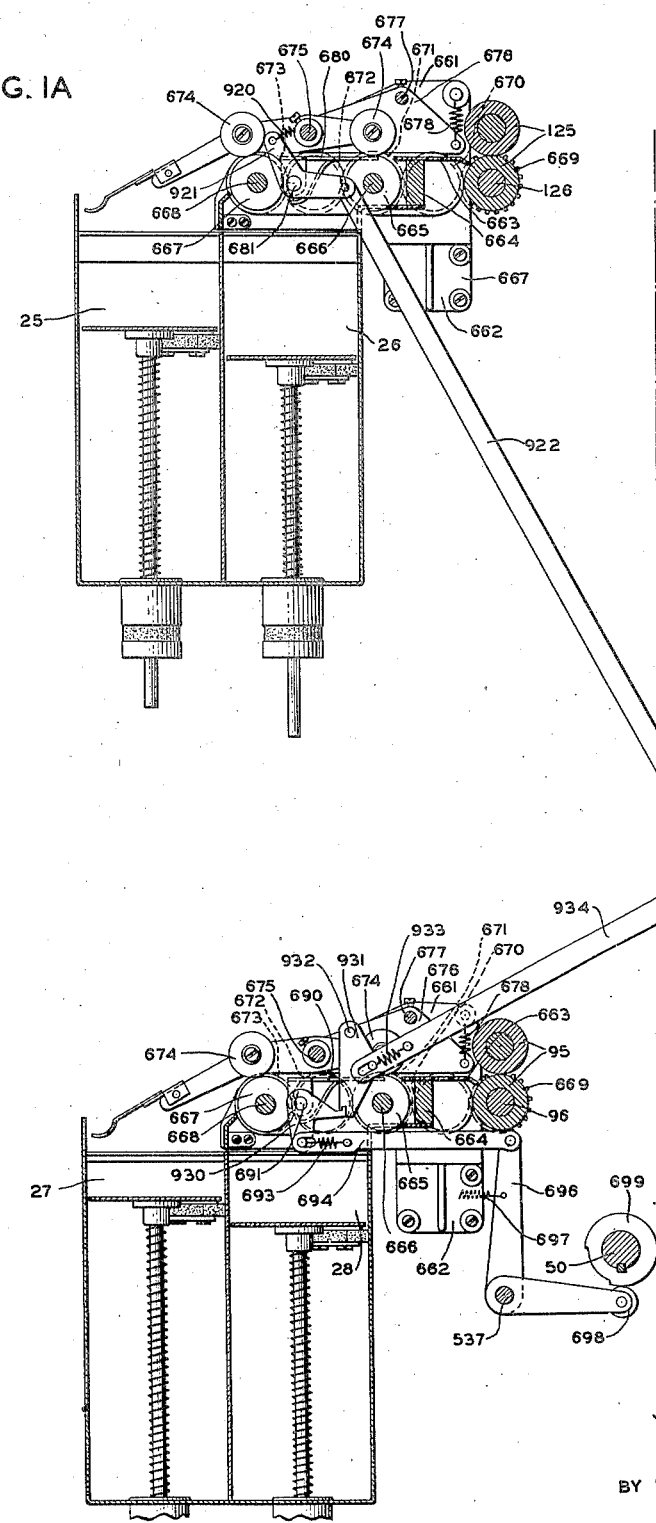
INVENTOR
JOSEPH M. MCDONNELL
BY *H. A. Sparks*
ATTORNEY Jan. 28, 1941. J. M. McDONNELL 2,229,983
STATISTICAL CARD COMPARING MACHINE
Filed Dec. 21, 1939 7 Sheets-Sheet 3
FIG. 2
FIG. 2A
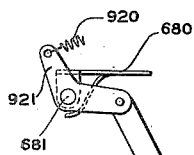
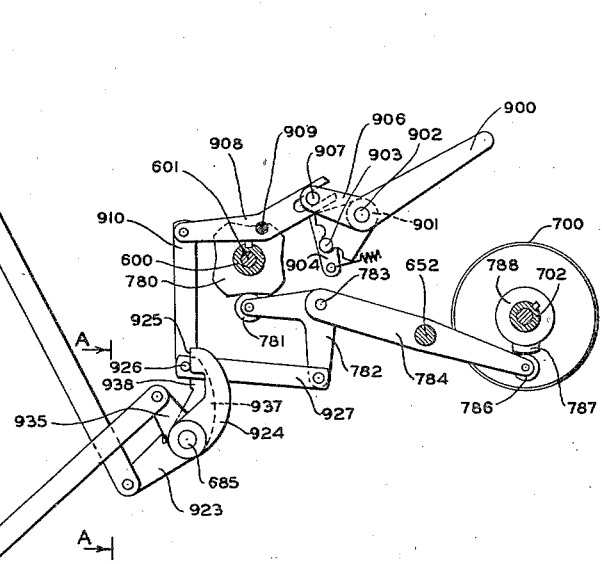
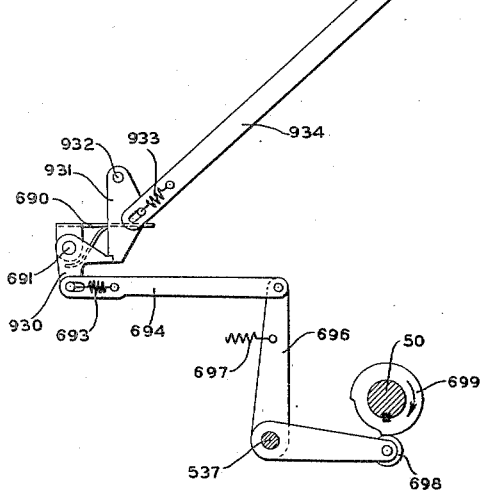
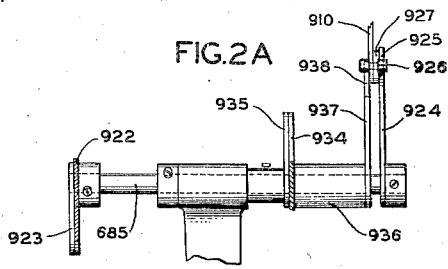
INVENTOR
JOSEPH M. MCDONNELL
BY H. A. Spark
ATTORNEY Jan. 28, 1941.　　J. M. McDONNELL　　2,229,983
STATISTICAL CARD COMPARING MACHINE
Filed Dec. 21, 1939　　7 Sheets-Sheet 4
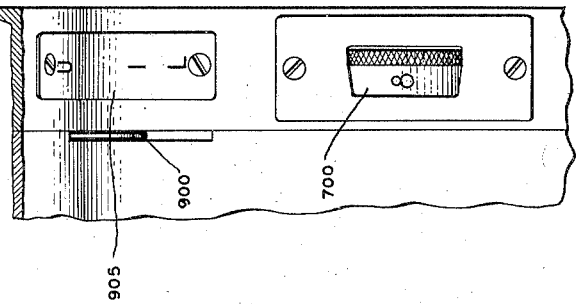
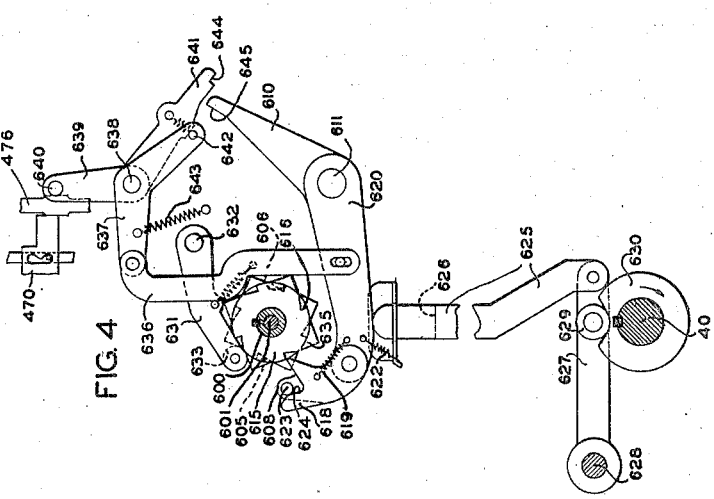
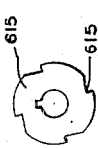
INVENTOR
JOSEPH M. MC DONNELL
BY W. A. Sparks
ATTORNEY Jan. 28, 1941.   J. M. McDONNELL   2,229,983
STATISTICAL CARD COMPARING MACHINE
Filed Dec. 21, 1939   7 Sheets-Sheet 5

INVENTOR
JOSEPH M. MCDONNELL
BY *H. A. Spark*
ATTORNEY

FIG. 8

| OPERATION NUMBER | TYPE OF OPERATION | SETTING OF SORTING CONTROL LEVER 900 | PUNCH TRANSLATOR | CONTROL CAMS EFFECTIVE IN ADDITION TO SELECTED CARD FEED CAM | OPERATION ON COMPARISON | | | | OPERATION ON NON-COMPARISON | | | |
|---|---|---|---|---|---|---|---|---|---|---|---|---|
| | | | | | MASTER CARD DEFLECTOR 680 OPERATED | DETAIL CARD DEFLECTOR 690 OPERATED | PUNCH RETRACT MECHANISM HELD EFFECTIVE | STOPPING MECHANISM OPERATED | MASTER CARD DEFLECTOR 680 OPERATED | DETAIL CARD DEFLECTOR 690 OPERATED | PUNCH RETRACT MECHANISM HELD EFFECTIVE | STOPPING MECHANISM OPERATED |
| 1 | SORTING | I | OUT | 780 | | | | | X | X | | |
| 1A | SORTING | U | OUT | 780 | | | | | X | | | |
| 1B | SORTING | L | OUT | 780 | | | | | | X | | |
| 2 | SORTING | I | OUT | (780) | X | X | | | | | | |
| 2A | SORTING | U | OUT | (780) | X | | | | | | | |
| 2B | SORTING | L | OUT | (780) | | X | | | | | | |
| 7 | PUNCHING & SORTING | I | IN | 770 & 780 | | | | | X | X | X | |
| 7A | PUNCHING & SORTING | U | IN | 770 & 780 | | | | | X | | X | |
| 7B | PUNCHING & SORTING | L | IN | 770 & 780 | | | | | | X | X | |
| 8 | PUNCHING & SORTING | I | IN | 770 & (780) | X | X | | | | | X | |
| 8A | PUNCHING & SORTING | U | IN | 770 & (780) | X | | | | | | X | |
| 8B | PUNCHING & SORTING | L | IN | 770 & (780) | | X | | | | | X | |
| 9 | PUNCHING & SORTING | I | IN | (770) & 780 | | | X | | X | X | | |
| 9A | PUNCHING & SORTING | U | IN | (770) & 780 | | | X | | X | | | |
| 9B | PUNCHING & SORTING | L | IN | (770) & 780 | | | X | | | X | | |
| 10 | PUNCHING & SORTING | I | IN | (770) & (780) | X | X | X | | | | | |
| 10A | PUNCHING & SORTING | U | IN | (770) & (780) | X | | X | | | | | |
| 10B | PUNCHING & SORTING | L | IN | (770) & (780) | | X | X | | | | | |
| 11 | STOPPING & SORTING | I | OUT | 760 & 780 | | | | | X | X | | X |
| 11A | STOPPING & SORTING | U | OUT | 760 & 780 | | | | | X | | | X |
| 11B | STOPPING & SORTING | L | OUT | 760 & 780 | | | | | | X | | X |
| 12 | STOPPING & SORTING | I | OUT | (760) & 780 | | | | X | X | X | | |
| 12A | STOPPING & SORTING | U | OUT | (760) & 780 | | | | X | X | | | |
| 12B | STOPPING & SORTING | L | OUT | (760) & 780 | | | | X | | X | | |
| 13 | STOPPING & SORTING | I | OUT | 760 & (780) | X | X | | | | | | X |
| 13A | STOPPING & SORTING | U | OUT | 760 & (780) | X | | | | | | | X |
| 13B | STOPPING & SORTING | L | OUT | 760 & (780) | | X | | | | | | X |
| 14 | STOPPING & SORTING | I | OUT | (760) & (780) | X | X | | X | | | | |
| 14A | STOPPING & SORTING | U | OUT | (760) & (780) | X | | | X | | | | |
| 14B | STOPPING & SORTING | L | OUT | (760) & (780) | | X | | X | | | | |

FIG. 8A

| | | | | | | | | | | |
|---|---|---|---|---|---|---|---|---|---|---|
| 19 | PUNCHING, STOPPING & SORTING | I | IN | 770 & 760 & 780 | | | | X | X | X | X |
| 19 A | PUNCHING, STOPPING & SORTING | U | IN | 770 & 760 & 780 | | | | X | | X | X |
| 19 B | PUNCHING, STOPPING & SORTING | L | IN | 770 & 760 & 780 | | | | | X | X | X |
| 20 | PUNCHING, STOPPING & SORTING | I | IN | (770) & 760 & 780 | | X | | X | X | | X |
| 20 A | PUNCHING, STOPPING & SORTING | U | IN | (770) & 760 & 780 | | X | | X | | | X |
| 20 B | PUNCHING, STOPPING & SORTING | L | IN | (770) & 760 & 780 | | X | | | X | | X |
| 21 | PUNCHING, STOPPING & SORTING | I | IN | 770 & (760) & 780 | | | X | X | X | X | |
| 21 A | PUNCHING, STOPPING & SORTING | U | IN | 770 & (760) & 780 | | | X | X | | X | |
| 21 B | PUNCHING, STOPPING & SORTING | L | IN | 770 & (760) & 780 | | | X | | X | X | |
| 22 | PUNCHING, STOPPING & SORTING | I | IN | (770) & (760) & 780 | | X | X | X | X | | |
| 22 A | PUNCHING, STOPPING & SORTING | U | IN | (770) & (760) & 780 | | X | X | X | | | |
| 22 B | PUNCHING, STOPPING & SORTING | L | IN | (770) & (760) & 780 | | X | X | | X | | |
| 23 | PUNCHING, STOPPING & SORTING | I | IN | 770 & 760 & (780) | X | X | | | | X | X |
| 23 A | PUNCHING, STOPPING & SORTING | U | IN | 770 & 760 & (780) | X | | | | | X | X |
| 23 B | PUNCHING, STOPPING & SORTING | L | IN | 770 & 760 & (780) | | X | | | | X | X |
| 24 | PUNCHING, STOPPING & SORTING | I | IN | (770) & 760 & (780) | X | X | X | | | | X |
| 24 A | PUNCHING, STOPPING & SORTING | U | IN | (770) & 760 & (780) | X | | X | | | | X |
| 24 B | PUNCHING, STOPPING & SORTING | L | IN | (770) & 760 & (780) | | X | X | | | | X |
| 25 | PUNCHING, STOPPING & SORTING | I | IN | 770 & (760) & (780) | X | X | | X | | X | |
| 25 A | PUNCHING, STOPPING & SORTING | U | IN | 770 & (760) & (780) | X | | | X | | X | |
| 25 B | PUNCHING, STOPPING & SORTING | L | IN | 770 & (760) & (780) | | X | | X | | X | |
| 26 | PUNCHING STOPPING & SORTING | I | IN | (770) & (760) & (780) | X | X | X | X | | | |
| 26 A | PUNCHING STOPPING & SORTING | U | IN | (770) & (760) & (780) | X | | X | X | | | |
| 26 B | PUNCHING STOPPING & SORTING | L | IN | (770) & (760) & (780) | | X | X | X | | | |
| 27 | SORTING (WITH PUNCHING) | I | IN | 780 | | | | | X | X | | |
| 27 A | SORTING (WITH PUNCHING) | U | IN | 780 | | | | | X | | | |
| 27 B | SORTING (WITH PUNCHING) | L | IN | 780 | | | | | | X | | |
| 28 | SORTING (WITH PUNCHING) | I | IN | (780) | X | X | | | | | | |
| 28 A | SORTING (WITH PUNCHING) | U | IN | (780) | X | | | | | | | |
| 28 B | SORTING (WITH PUNCHING) | L | IN | (780) | | X | | | | | | |
| 31 | STOPPING & SORTING (WITH PUNCHING) | I | IN | 760 & 780 | | | | | X | X | | X |
| 31 A | STOPPING & SORTING (WITH PUNCHING) | U | IN | 760 & 780 | | | | | X | | | X |
| 31 B | STOPPING & SORTING (WITH PUNCHING) | L | IN | 760 & 780 | | | | | | X | | X |
| 32 | STOPPING & SORTING (WITH PUNCHING) | I | IN | (760) & 780 | | | X | X | X | | | |
| 32 A | STOPPING & SORTING (WITH PUNCHING) | U | IN | (760) & 780 | | | X | X | | | | |
| 32 B | STOPPING & SORTING (WITH PUNCHING) | L | IN | (760) & 780 | | | X | | X | | | |
| 33 | STOPPING & SORTING (WITH PUNCHING) | I | IN | 760 & (780) | X | X | | | | | | X |
| 33 A | STOPPING & SORTING (WITH PUNCHING) | U | IN | 760 & (780) | X | | | | | | | X |
| 33 B | STOPPING & SORTING (WITH PUNCHING) | L | IN | 760 & (780) | | X | | | | | | X |
| 34 | STOPPING & SORTING (WITH PUNCHING) | I | IN | (760) & (780) | X | X | X | | | | | |
| 34 A | STOPPING & SORTING (WITH PUNCHING) | U | IN | (760) & (780) | X | | X | | | | | |
| 34 B | STOPPING & SORTING (WITH PUNCHING) | L | IN | (760) & (780) | | X | X | | | | | |

INVENTOR
JOSEPH M. MC DONNELL
BY *W. A. Sparks*
ATTORNEY

Patented Jan. 28, 1941

2,229,983

UNITED STATES PATENT OFFICE 2,229,983

STATISTICAL CARD COMPARING MACHINE

Joseph M. McDonnell, Baldwin, N. Y., assignor to Remington Rand Inc., Buffalo, N. Y., a corporation of Delaware Application December 21, 1939, Serial No. 310,384

5 Claims. (Cl. 164—114)

This invention relates to machines for comparing perforation patterns in different records and particularly to the record sorting means of such machines.

An embodiment of the invention is shown herein as applied to a statistical card comparing machine of the type disclosed in the copending application of Karl J. Braun, S. N. 228,381, filed September 3, 1938, now Patent No. 2,211,094, dated August 13, 1940. Machines of the type shown in said application are employed in accounting or statistical systems in which master records are used in conjunction with detail records. In these systems it is desirable to compare prepunched designative data contained in the detail records with pre-punched designative data contained in the master records, and to control or effect various other operations in connection with such records in accordance with the comparison, or non-comparison, of the pre-punched data.

In the machine disclosed in the cited application either of three types of operations can be performed, namely—

1. Record sorting (i. e., to segregate comparing master records from non-comparing master records, and to segregate comparing detail records from non-comparing detail records), 2. Record punching (i. e., to reproduce data contained in the master records, other than that used for comparing purposes, in the detail records) or 3. Stopping the machine (e. g., to permit the insertion of control records at desired points in the run of compared records).

Each of these operations may be effected selectively or in combination with either or both of the others upon the sensing of a comparison, or non-comparison, between designative perforation patterns in master and detail records, according to the requirements of a particular accounting or statistical problem. The machine is also provided with variably controllable master and detail record feeding mechanisms whereby any one of a plurality of different types of master and/or detail record feeding may be effected, according to the quantitative relationship of the master and detail records to be handled in a particular problem, in conjunction with any desired combination of the above mentioned sorting, punching, and stopping operations. Furthermore, an operation selector mechanism is provided whereby a given machine may be preconditioned, in accordance with the several individual types of record handling problems that may arise in a given accounting or statistical system, to effect selectively any one of a plurality of the various available combinational operations of record sorting, and/or record punching, and/or machine stopping, and record feeding. In the particular arrangement shown in the cited application, the operation selector mechanism is controlled by an operation selector dial, manually settable to eight positions, whereby a statistical card comparing machine may be arranged to effect any one of eight of such combinational operations selectively.

The principal object of the present invention is to increase the flexibility of the record sorting means of record comparing machines.

In order to segregate comparing master and detail records from non-comparing master and detail records in the machine disclosed in the cited application, there are provided two receiving pockets for master records and two additional receiving pockets for detail records. In addition, inter-connected deflector mechanisms, operable by a control mechanism in accordance with the sensing of comparisons or non-comparisons between perforation patterns of designative data contained in the master and detail records, are provided for each set of receiving pockets. By these means, comparing detail records are conveyed to a detail record "receiver" pocket, and non-comparing detail records are conveyed to a detail record "eject" pocket. Likewise, comparing master records are conveyed to a master record "receiver" pocket, and non-comparing master records are conveyed to a master record "eject" pocket. By this arrangement, when the record files handled in a specific accounting or statistical problem comprise comparing and non-comparing detail records, as well as comparing and non-comparing master records, all comparing detail records are segregated from the non-comparing detail records, and all comparing master records are segregated from the non-comparing master records.

However, in problems of this type, it has been found that although it is necessary to segregate the records of either the master file or of the detail file, it is frequently undesirable to segregate the records of both files in the same operation. For example, a given record handling problem may require that a file of master records be compared successively with several separate detail record files, and that the comparing and non-comparing records of each detail file be segregated in preparation for subsequent tabulating operations. Under these conditions, if the comparing and non-comparing master records are segregated during the operation in which they are compared with one detail record file, it is apparent that the master records must be re-sorted, to arrange them in proper order, before they can be compared with the records of another detail record file.

To obviate the need for re-sorting operations under such conditions, the present invention provides, as its principal feature, improved means for controlling the deflector mechanisms of the master and detail record receiving pockets whereby a statistical record comparing machine may be preconditioned to—

1. Segregate comparing detail records from non-comparing detail records, and to convey all master records to one receiving pocket, 2. Segregate comparing master records from non-comparing master records, and to convey all detail records to one receiving pocket, 3. Segregate comparing detail records from non-comparing detail records, as well as to segregate comparing master records from non-comparing master records.

To obtain these results, manually settable means are provided which, when the sorting control mechanism is rendered effective for operation, may be set in either of a plurality of positions to cause selective operation of the deflector mechanism of the master record receiving pockets, or of the deflector mechanism of the detail record receiving pockets, or of the deflector mechanisms of both the master and detail record receiving pockets, in accordance with the sensing of comparisons, or non-comparisons, between perforation patterns of designative data contained in the master and detail records.

A preferred form of the invention is shown in the drawings, in which:

Figs. 1 and 1A, considered together, comprise a left side elevation of the invention, partly in section, in conjunction with the elements of a statistical card comparing machine that cooperate therewith, showing the relative positions of the several elements when the machine is in normal or stopping position;

Fig. 2 is a left side elevation of the invention in conjunction with the deflector mechanisms of the master and detail card receiving pockets, showing the relative positions of the several elements at the end of a cycle following the sensing of a comparison;

Fig. 2A is a rear elevation slightly enlarged, taken along the line A—A of Fig. 2;

Fig. 3 is a view taken along the line 3—3 of Fig. 1, showing the relative positions of the operation selector dial and the sorting control lever;

Fig. 4 is a detail of the control device actuating mechanism, showing the parts in the position attained at the end of a cycle in which a comparison is sensed;

Fig. 5 is an enlarged view of the inner ratchet of the control device actuating mechanism;

Fig. 6 is an enlarged view of the outer ratchet of the control device actuating mechanism;

Figs. 8 and 8A, taken together, form a chart indicating the various combinational settings of the operation control cams and the sorting control lever for effecting different types of card handling operations.

To facilitate an understanding of the invention, a brief description of a statistical card comparing machine of the type disclosed in the above cited application, with which the invention is particularly adapted to function, is included hereinafter. For a detailed description of such machine, reference may be had to the cited application.

*Statistical card comparing machine—Basic mechanism*

Figure 7:
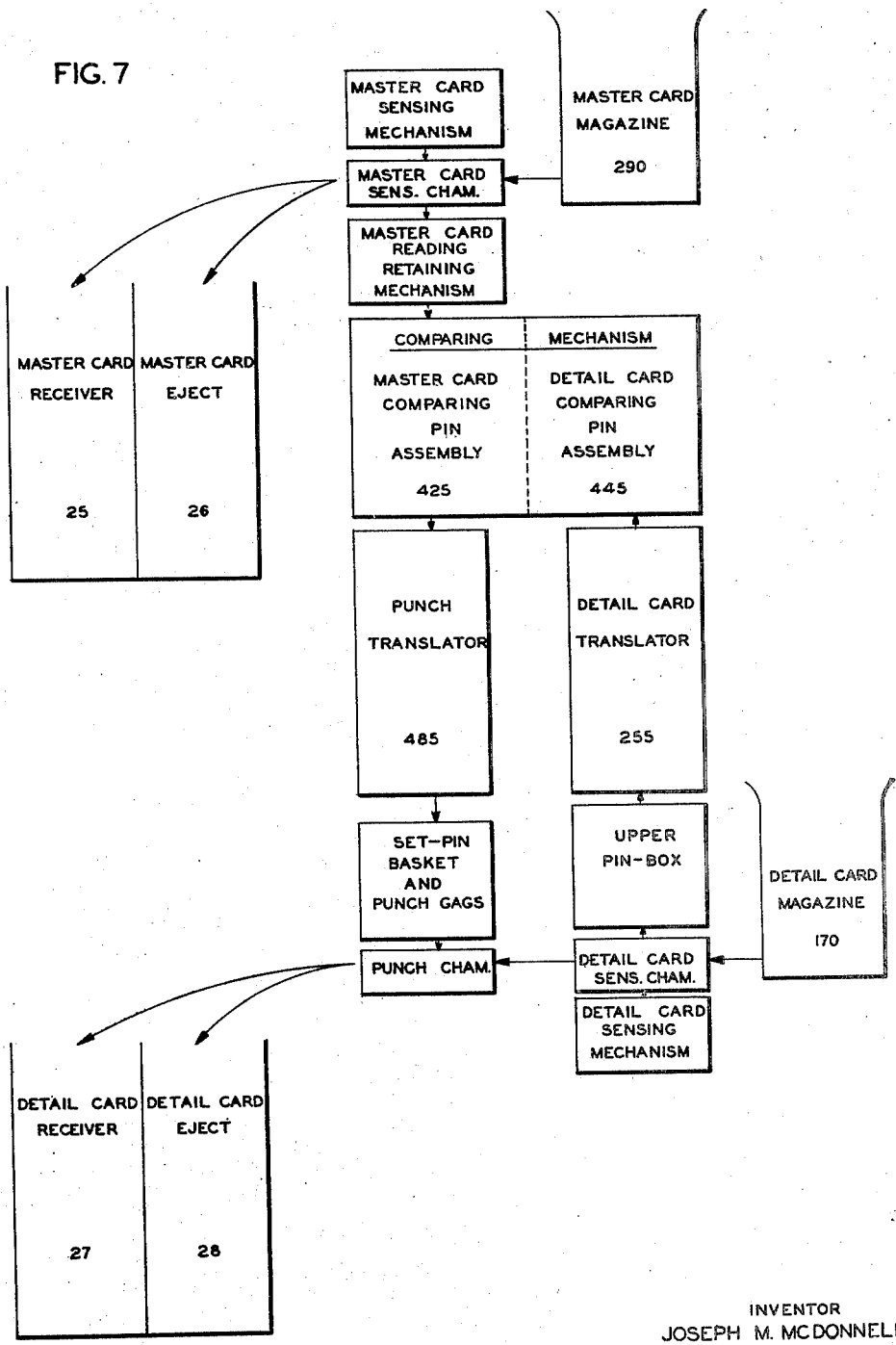
Fig. 7 is a schematic illustration of the principal elements of a statistical card comparing machine of the type disclosed in the above cited application.

In a machine of the type disclosed in the cited application, detail cards are placed in a detail card magazine 170 (see Fig. 7) and are passed seriatim to suitable feed rolls whereby they are conveyed, first, to the detail card sensing chamber in which their perforated data is analyzed, then, in the following cycle, to a punch chamber in which additional data may be perforated in the cards. In the next cycle, the detail cards are conveyed from the punch chamber to a "receiver" pocket 27 or, in the event the sorting control mechanism hereinafter described is effective, they are conveyed either to the "receiver" pocket or to an "eject" pocket 28, depending on the setting of the sorting control mechanism and the character of the designative data in the cards. During the period in which a detail card is held in the detail card sensing chamber, the perforation pattern therein is analyzed by sensing pins mounted in a reciprocating pin box of the detail card sensing mechanism whereby a mechanical representation of such perforation pattern is transmitted, by means of pins in an upper pin box and translator wires in a translator 255, to the detail card comparing pin assembly 445 of the comparing mechanism.

Master cards are placed in a master card magazine 290 and are passed seriatim to suitable feed rolls whereby they are conveyed to the master card sensing chamber in which their perforated data is analyzed. In the following cycle, the master cards are conveyed to a "receiver" pocket 25 or, in the event the sorting control mechanism hereinafter described is effective, they are conveyed either to the "receiver" pocket or to an "eject" pocket 26, depending on the setting of the sorting control mechanism and the character of the designative data in the cards. During the period in which a master card is held in the master card sensing chamber, the perforation pattern contained therein is analyzed by sensing pins mounted in a reciprocating pin box of the master card sensing mechanism whereby a mechanical representation of such perforation pattern is transmitted to pins in a master card reading retaining mechanism wherein it is retained, by suitable locking mechanism, until a new master card is sensed. The movement of the pins in the reading retaining mechanism is transmitted directly to the master card comparing pin assembly 425 of the comparing mechanism.

*Comparing mechanism*

Figure 1:
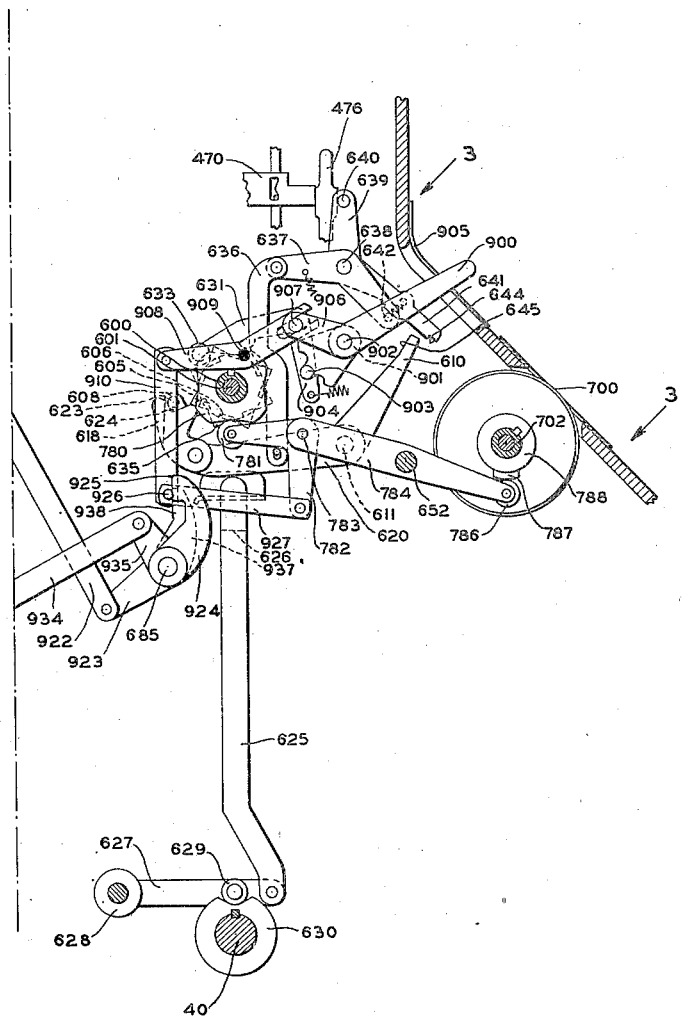

In the comparing mechanism the mechanical representations of master and detail card perforation patterns are mechanically compared and the occurrence of a comparison, or non-comparison, between such perforation patterns is utilized to control or vary machine operations. A knowledge of the specific construction of the comparing mechanism is not essential to an understanding of the present invention, but may be obtained from the cited application. Insofar as the present invention is concerned, it is sufficient to understand that the movement of the pins in the master and detail card comparing pin assemblies 425 and 445 (Fig. 7), in accordance with the perforation patterns in master and detail cards, is effective to determine the position of certain comparing slides 470 (partially illustrated in Fig. 1), one of which is provided for each column of a record card. Abutting each slide 470 is a manually settable interponent 476 which, when that column is to be used for comparing purposes, is set in its upper or effective position, as in Fig. 1. The construction and arrangement of the comparing mechanism is such that in the event the compared perforation patterns are identical, the slides 470 are free to move to the left to permit leftward movement of a comparing slide sensing bail rod 640 as in Fig. 1. However, if either pattern contains a perforation for which there is no counterpart in the other, one or more of the slides 470 is blocked and, together with its associated interponent 476, serves to prevent the leftward movement of bail rod 640. The manner in which bail rod 640 is operated to sense the position of comparing slides 470 is described hereinafter under the heading Control device—Actuating mechanism.

Control device

As completely disclosed in the cited application, each of the mechanisms for effecting or varying machine functions such as card feeding, sorting, punching, and stopping the machine, as the result of the sensing of a comparison, or non-comparison, in the perforation patterns of master and detail cards, are actuated by individual control cams which may be rendered effective either singly or in combination, as desired, and are arranged for step-by-step operation by common actuating mechanism under control of the comparing mechanism. For convenience, the several control cams and their associated mechanisms, the manually settable means for selectively rendering the control cams effective, and the control cam actuating mechanism, are referred to as the control device.

Control device—Actuating mechanism

Each of the several control cams employed in a machine of this type is secured to a sleeve 600 (Figs. 1, 2, and 4) rotatably mounted on a stud 601 fixed in the frame of the machine. Each of the control cams is arranged to control its associated mechanism in one manner when the perforation patterns in simultaneously sensed master and detail cards compare, and in a different manner when such perforation patterns do not compare. Therefore, the control cams are arranged to be actuated to effect their respective functions whenever a non-comparison is sensed after a cycle in which a comparison was sensed and, also, whenever a comparison is sensed after a cycle in which a non-comparison was sensed. To effect the requisite movement of the control cams, an actuating mechanism, operable under control of the comparing mechanism, is provided to cause recurrent step-by-step movement of sleeve 600. This mechanism comprises an inner ratchet 605 (see Fig. 5) and an outer ratchet 615 (see Fig. 6) each provided with four equally spaced teeth 606 and 616, respectively, and having blank spaces, equivalent to a tooth space, between adjacent teeth. Both ratchets are fast to sleeve 600 (see Fig. 4) but are offset relative to each other so that teeth 616 of ratchet 615 are intermediate to teeth 606 of ratchet 605 whereby, in effect, they form an eight toothed ratchet. Coacting with ratchet 605 is an actuating pawl 608, urged clockwise by a light spring (not shown), carried by the horizontal arm of a lever 610 which is pivoted on a frame stud 611 and is urged counter-clockwise by a spring (not shown). Coacting with ratchet 615 is an actuating pawl 618, urged clockwise by a spring 619, carried by a lever 620 which is also pivoted on stud 611 and is urged counter-clockwise by a spring 622. The arrangement of ratchets 605, 615 and pawls 608, 618 is such that during machine cycles following those in which a comparison was sensed, pawl 608 registers with a blank space on ratchet 605, whereas pawl 618 is in position to register with a tooth 616 on ratchet 615. However, when levers 610 and 620 are in their lowermost positions, a stud 623 on pawl 608 coacts with a cam surface 624 on pawl 618, whereby pawl 618 is moved counter-clockwise against the tension of spring 619 to prevent the engagement of the pawl with a tooth 616.

For operating pawls 608 and 618, an offset push rod 625, provided at its upper end with an abutment 626 arranged to coact with levers 610 and 620, is connected to an arm 627 pivoted at 628 and provided with a follower roller 629 that coacts with a cam 630, keyed to a cam shaft 40 that makes one revolution during each machine cycle. The arrangement of cam 630 is such that levers 610 and 620 are held in their uppermost position by push rod 625 and abutment 626 during the greater part of each cycle but are urged downwardly by their springs at approximately 30° before the end of the cycle, and reach their lowermost positions at the end of the cycle. During the early part of each cycle push rod 625 is elevated and, in the event either pawl 608 or 618 has engaged a tooth 606 or 616, respectively, is effective to actuate sleeve 600 through one-eighth of a revolution. However, in the event pawls 608 or 618 are not engaged with ratchets 605 or 615, respectively, levers 610 and 620 are operated idly and no movement is imparted to sleeve 600. A spring urged detent arm 631, pivoted at 632 and having a roller 633 arranged to coact with a detent plate 635 fast on sleeve 600, is provided to center sleeve 600 in each of its several positions.

In order to effect an actuation of sleeve 600 whenever there is a non-comparison between master and detail card perforation patterns in a cycle following one in which a comparison was sensed, and vice versa, means are provided to sense the position of comparing slides 470 of the comparing mechanism during each cycle and to control actuating pawls 605 and 615 accordingly. For this purpose, an offset vertical link 636 is joined by a pin-in-slot connection to lever 620 and is connected at its upper end to the horizontal arm of a bell-crank 637 pivotally mounted on a transverse rock shaft 638. Secured to shaft 638 are two arms 639 supporting a bail rod 640 which is adapted to sense the position of comparing slides 470 through manually settable interponents 476 which are set in effective position, as shown in the drawings, in the columns containing the designative data.

Also fast on rock shaft 638 is an oblique arm 641 which is spring urged into engagement with a limit stud 642 on the pendant arm of bellcrank 637, and is provided with a cutaway shoulder 644 arranged to engage a latch face 645 on an upwardly extending arm of lever 610. The entire assembly comprising shaft 638, bell-crank 637, arms 639 and 641 is urged counter-clockwise by a comparatively strong spring 643 extended between the horizontal arm of the bell-crank and a frame stud.

At the beginning of each cycle cam 630 elevates push rod 625 and, through lever 620, link 636, bell-crank 637, and arm 641, rocks shaft 638 clockwise to move bail rod 640 out of engagement with interponents 476. Toward the end of each cycle, shortly after comparing slides 470 are positioned, follower roller 629 rides into the low dwell of cam 630 thereby lowering lever 620 and link 636, and permitting spring 643 to urge bell-crank 637 and shaft 638 counter-clockwise. In the event all comparing slides 470 in the columns containing designative data are free to move leftwardly, as in the case when the compared perforation patterns in master and detail cards are identical, bail rod 640 is free to move leftwardly whereby shaft 638 rocks counter-clockwise and withdraws shoulder 644 on arm 641 from the path of movement of latch face 645 as lever 610 is rocked counter-clockwise. In this case, when levers 610 and 620 rock to their lowermost positions, pawl 608 rides on a blank space of ratchet 605, and stud 623 coacts with cam face 624 to prevent the engagement of pawl 618 with ratchet 615. Thus, when a cycle in which a comparison is sensed follows a cycle in which a comparison was sensed, no movement is imparted to sleeve 600, and the control cams thereon function in the same manner as in the preceding cycle. However, in the event one, or more, of the comparing slides 470 is held in its extreme rightward position when shaft 638 is urged counter-clockwise, as in the case when the perforation patterns in master and detail cards are not identical, bail rod 640 is prevented from moving leftwardly. Shaft 638 is thereby held in rocked position and retains shoulder 644 on arm 641 in the path of movement of latch face 645. In this case, lever 610 is held in its uppermost position as lever 620 descends. Thus, stud 623 is ineffective to prevent the engagement of pawl 618, and spring 619 engages pawl 618 with a tooth 616 on ratchet 615 when lever 620 reaches its lowermost position. Immediately thereafter, push rod 625 is again elevated to actuate lever 620 and pawl 618 which, in turn, actuate sleeve 600. Thus, when a cycle in which a non-comparison is sensed follows a cycle in which a comparison was sensed, sleeve 600 is rotated through one step by lever 620, and the control cams thereon are positioned to control their associated mechanisms accordingly.

In the event another non-comparison is sensed at the end of the succeeding cycle, lever 610 is retained in its uppermost position, as above. In this case, since pawl 618 is now in register with a blank space on ratchet 615, lever 620 moves idly and no further movement is imparted to sleeve 600. This condition is maintained as long as the perforation patterns in simultaneously sensed master and detail card perforation patterns do not compare. However, when the next comparison is sensed, bail rod 640 and shaft 638 are free to rock counter-clockwise and serve to disengage shoulder 644 from latch face 645 to permit lever 610 to follow push rod 625 downwardly. In this case, since pawl 608 is now in register with a tooth 606 on ratchet 605, the subsequent elevation of push rod 625 is effective to actuate sleeve 600. Thus, when a cycle in which a comparison is sensed follows a cycle in which a non-comparison was sensed, sleeve 600 is rotated through one step by lever 610, and the control cams thereon are positioned to control their associated mechanisms accordingly.

Control device—Card sorting control mechanism

In punched card systems involving the comparison between perforation patterns of designative data in master and detail cards, it is frequently desirable that the master cards for which there are corresponding detail cards be segregated from the master cards for which there are no corresponding detail cards, or that the detail cards for which there are corresponding master cards be segregated from the detail cards for which there are no corresponding master cards, or, finally, that both master and detail cards be segregated. To effect these functions in the present machine, master card pocket feed rolls are provided to convey master cards from the ejector rolls of the master card sensing mechanism to the master card receiving pockets, and detail card pocket feed rolls are provided to convey detail cards from the ejector rolls of the detail card punch mechanism to the detail card receiving pockets. Furthermore, separate deflector mechanisms, operable in accordance with the action of the comparing mechanism, are provided for each set of card pocket feed rolls whereby comparing detail and master cards may be passed to their respective "receiver" pockets, and non-comparing detail and master cards may be passed to their respective "eject" pockets, or vice versa, as desired.

A. Receiving pocket feed roll mechanisms

Referring to Fig. 1A, the master card receiving pocket feed rolls are arranged in suitable castings 661 supported by brackets 662 secured to the frame of the machine. After leaving the master card sensing mechanism, master cards are passed by ejector rolls 125 over a table plate 663, supported by a cross bar 664, to feed rolls 665 mounted on a transverse shaft 666 journaled in the side castings 661. From feed rolls 665, the cards may be deflected into an "eject" pocket 26, as hereinafter described, or may be fed over a second set of feed rolls 667, mounted on a transverse shaft 668 also journaled in side castings 661, into a "receiver" pocket 25. For rotating feed rolls 665 and 667, a gear 669 is fixed to lower ejector roll shaft 126 and serves, through an idler 670, to drive a gear 671 fixed on feed roll shaft 666, which, in turn, through a second idler 672, drives a gear 673 on feed roll shaft 668. In order to secure relatively positive feeding of the master cards, skid rolls 674 are mounted on levers pivotally mounted on a cross rod 675, which, in turn, is supported by levers 676 pivoted on a cross rod 677. Skid rolls 674 are urged against their respective feed rolls 665 and 667 by springs 678 extended from the right ends of levers 676.

The detail card feed roll mechanism is arranged, in the same manner, to convey detail cards from ejector rolls 95 of the detail card punch mechanism either to an "eject" pocket 28 or to a "receiver" pocket 27. Therefore, similar reference characters are used to designate corresponding parts.

B. Master card deflector mechanism

For guiding master cards into "receiver" pocket 25 or "eject" pocket 26, a card deflector 680 (see Figs. 1A and 2) is arranged between master card pocket feed rolls 665 and 667 and is fixed on a transverse rock shaft 681 journaled in side castings 661. Card deflector 680 is arranged to occupy either of two positions, namely, a horizontal or closed position, as shown in the drawings, in which it serves to guide cards from rolls 665 to rolls 667 from whence they are passed to "receiver" pocket 25, or an inclined or open position in which it serves to deflect cards passed from rolls 665 into "eject" pocket 26. Deflector 680 is normally urged to its horizontal position by a spring 920 extended between a frame stud and the upwardly extending arm of a bell-crank 921, fixed on shaft 681, whereby, in the absence of further control, all master cards are guided to "receiver" pocket 25.

In order to control the position of deflector 680 in accordance with the action of the comparing mechanism, the horizontal arm of bell-crank 921 is connected by a link 922 (see also Fig. 1) to an arm 923 fast on a rock shaft 685 journaled in a suitable bracket on the frame of the machine. Fixed to the end of shaft 685 is a vertical arm 924 (see also Fig. 2A) having a working face 925 that lies in the path of movement of a pin 926, fixed in the end of a horizontal link 927. Link 927 is connected to the pendant arm of a bell-crank 782 pivoted at 783, to a lever 784 pivotally mounted on frame stud 652. The horizontal arm of bell-crank 782 carries a roller 781 adapted to coact with a card sorting control cam 780 that is keyed to sleeve 600 of the control device. The arrangement of this linkage is such that when cam 780 is to be rendered effective to control card sorting, lever 784 is rocked clockwise, as hereinafter described, to elevate pivot 783 and move roller 781 into operative relationship with cam 780. Thus, when a non-comparison is sensed, sleeve 600 is actuated by cam 630, as described above, to place the adjacent high dwell of cam 780 in register with roller 781. Bell-crank 782 is thereby rocked counterclockwise and, through link 927, pin 926, and arm 924, rocks shaft 685 clockwise whereby link 922 is elevated to rock deflector 680 to its inclined position. As described in the cited application, the actuation of sleeve 600 which serves to rock deflector 680 is effected in the early part of the cycle following that in which the non-comparison is sensed. Thus, deflector 680 is held open during the greater part of the following cycle, and serves to deflect the non-comparing master card, which is passed from the master card sensing chamber during the mid-portion of this cycle, into "eject" pocket 26. In the event the succeeding master card also contains a non-comparing perforation pattern, no further movement is imparted to sleeve 600 and the succeeding non-comparing master card is also passed to "eject" pocket 26. However, if the succeeding master card contains a comparing perforation pattern, sleeve 600 is again actuated as described above, to place a low dwell of cam 780 in register with roller 781 whereby deflector 680 is restored to its horizontal position by spring 920, at the beginning of the succeeding cycle, to guide the comparing master card to "receiver" pocket 25.

C. Detail card deflector mechanism

In order to segregate detail cards in a similar manner, a detail card deflector 690 (see Figs. 1A and 2) is arranged between detail card pocket feed rolls 665 and 667, and is fixed to a transverse rock shaft 691 journaled in side castings 661. Fixed to the end of rock shaft 691 is a bell-crank 930 having a pin in its pendant arm that extends into a slot in a horizontal link 694. Bell-crank 930 is urged counter-clockwise, to urge deflector 690 to its inclined position, by a spring 693, extended between the pin on the bell-crank and a pin on link 694, but is retained in the position shown in Figs. 1A and 2 by a latch plate 931, pivoted at 932 and provided with a notched shoulder arranged to engage a hook on the horizontal arm of the bell-crank. In order to control the position of deflector 690 in accordance with the action of the comparing mechanism, latch plate 931 is joined by a pin-in-slot connection, and a light spring 933, to a link 934 (see also Fig. 1) which is connected to an arm 935, fixed on a sleeve 936 (see also Fig. 2A) that is rotatably mounted on rock shaft 685. Also fixed to sleeve 936 is a vertical arm 937 having a working face 938 that lies in the path of movement of pin 926. With this arrangement, when a non-comparison is sensed, cam 780 rocks bell-crank 782 counter-clockwise and, by means of elements 927, 926, 937, 936, and 935, serves to elevate link 934. This movement through spring 933, tends to rock latch 931 counter-clockwise to release bell-crank 930, and to permit the opening of deflector 690 by spring 693.

However, as heretofore described, all detail cards are passed through the punch mechanism after leaving the detail card sensing mechanism, and require an additional cycle to reach their respective receiving pockets. Therefore, means are provided to prevent the opening of deflector 690 until immediately prior to the time that the non-comparing card is released from the punch chamber. For this purpose, spring 693 (see Fig. 2) is made substantially stronger than spring 933 whereby it serves to retain bell-crank 930 engaged with latch plate 931 when link 934 is elevated. Thus, the elevation of link 934 merely serves to tension spring 933. In order to release deflector 690 at the proper time, the right end of link 694 is connected to an offset bell-crank 696 pivotally mounted on a transverse shaft 537. Bell-crank 696 is urged counter-clockwise by a strong spring 697 whereby its follower roller 698 is urged against a cam 699 on a cam shaft 50, which, as described in the application, makes one revolution during each machine cycle. Near the end of the cycle following that in which the non-comparison is sensed, roller 698 rides into the low dwell of cam 699 and permits spring 697 to rock bell-crank 696, counter-clockwise to move link 694 leftwardly. This movement serves to rock bell-crank 930 slightly clockwise to disengage latch plate 931 whereby spring 933 is immediately effective to rock the latch plate counter-clockwise out of latching position. Immediately before the end of the cycle, cam 699 rocks bell-crank 696 clockwise to return link 694 to the position shown in the drawings, whereby spring 693 is effective to rock bell-crank 930 and shaft 691 counter-clockwise to open deflector 690. Thus, at the end of the cycle following that in which the non-comparison is sensed, deflector 690 is opened. During the next cycle, i. e., during the second cycle following the sensing of the non-comparison, the detail card is passed from the punch chamber, and is deflected into "eject" pocket 28.

Near the end of this cycle roller 698 again rides into the shallow dwell of cam 699. In this case, since spring 693 has pulled the pin in bell-crank 930 to the right end of the slot in link 694, spring 697 is effective to close deflector 690, and to rock bell-crank 930 to a position to engage latch plate 931. In the event another non-comparison is sensed, no movement is imparted to cam 780, and latch plate 931 is held in rocked position by spring 933, link 934, etc. In this case, cam 699 is effective near the end of the cycle, to reopen deflector 690 whereby the succeeding non-comparing detail card is also deflected into "eject" pocket 28. However, if a comparison is sensed, cam 780 is actuated one step whereby latch plate 931 is returned to its latching position to engage bell-crank 692. Deflector 690 is thereby retained in closed position to guide the comparing detail card to "receiver" pocket 27.

D. Selective control of deflector mechanisms

In order to control selectively the sorting of master cards, or detail cards, or master and detail cards concomitantly, the invention provides means manually settable to either of a plurality of positions to cause the operation either of the deflector mechanism of the master card receiving pockets, or of the deflector mechanism of the detail card receiving pockets, or of the deflector mechanisms of the master and detail card receiving pockets concomitantly, in accordance with the sensing of comparisons or non-comparisons between perforation patterns of designative data contained in master and detail cards. For this purpose, a sorting control lever 900 (Figs. 1, 2, and 3), the handle of which extends through a slot in the frame of the machine, is fixed to a hub 901 rotatably mounted on a frame stud 902. The other end of lever 900 is in the form of a detent plate having notches that cooperate with a detent roller 903 on a spring-urged detent arm 904. Also, fixed to hub 901 is an arm 906 having a pin 907 that extends into an open slot in a lever 908 that is pivotally mounted on a frame stud 909. Connected to the left end of lever 908 is a pendant link 910 which is connected at its lower end to link 927 by pin 926. By this arrangement, lever 900 may be set in either an upper position U, an intermediate position I, or a lower position L, as denoted on an indicator plate 905 (see Fig. 3), whereby pin 926 is correspondingly positioned relative to the working faces 925 and 938 on arms 924 and 937, respectively, of the master and detail card deflector mechanisms. Working faces 925 and 938 are so proportioned (see also Fig. 2A) that when pin 926 is in its upper position, it is in horizontal alignment only with face 925. In its lower position, pin 926 is in horizontal alignment only with face 938. In its intermediate position, pin 826 is in horizontal alignment with both working faces 925 and 938. By this means, when lever 900 is set in its upper position, only the master card deflector 680 is controlled in accordance with the action of the comparing mechanism, whereby the comparing master cards are conveyed to master card "receiver" pocket 25, and the non-comparing master cards are deflected to master card "eject" pocket 26. In this setting, since deflector 690 is not operated, all detail cards are conveyed to detail card "receiver" pocket 27. When lever 900 is set in its lower position, only the detail card deflector 690 is controlled in accordance with the action of the comparing mechanism, whereby the comparing detail cards are conveyed to detail card "receiver" pocket 27, and the non-comparing detail cards are deflected to detail card "eject" pocket 28. In this setting, since deflector 680 is not operated, all master cards are conveyed to master card "receiver" pocket 25. When lever 900 is set in its intermediate position, both deflectors 680 and 690 are controlled by the comparing mechanism, whereby comparing and non-comparing master cards, as well as comparing and non-comparing detail cards, are conveyed to their respective "receiver" and "eject" pockets.

Thus, when cam 780 is rendered effective to control card sorting, lever 900 may be set in accordance with the requirements of a given card handling problem to cause the sorting of master cards only, or of detail cards only, or of master cards and detail cards concomitantly.

Control device—Operation selector mechanism

In order to render sorting control cam 780 effective, means corresponding to those disclosed in the cited application are provided to select this cam for operation. For this purpose, a cam lug 787 (Figs. 1 and 2) may be placed in any desired position on a disc 788 which is secured to sleeve 702 of the operation selector mechanism. Then, when operation selector dial 700 is rotated to a position to place a lug 787 in register with a roller 786, carried on the right end of lever 784, lever 784 is rocked clockwise to elevate pivot 783 whereby roller 781 is moved into operative relationship with cam 780 to render the cam effective for controlling card sorting operations.

Combinational card handling operations

As described in the cited application, sorting control cam 780 may be provided with a second key-way, offset 45° from that shown in the drawings, whereby a high dwell of the cam is placed in register with roller 781 when a comparison is sensed, and a low dwell of the cam is placed in register with roller 781 when a non-comparison is sensed. When cam 780 is set on sleeve 600 in this position it controls sorting operations conversely to the manner described above, i. e., it causes all comparing master and detail cards to be guided to their respective "eject" pockets, and causes all non-comparing detail and master cards to be guided to their respective "receiver" pockets. The utility of this arrangement is apparent when it is considered that one type of punched card system may require all the comparing detail and/or master cards for a subsequent operation, whereas another type of punched card system may require all the non-comparing detail and/or master cards for a subsequent operation. In each case the machine may be arranged to pass the desired set, or sets, of cards to the "receiver" pockets, merely by shifting the starting position of cam 780. This feature substantially decreases the possibility of error on the part of the operator when the desired sets of cards are collected.

Obviously, card sorting control cam 780 may also be offset relative to sleeve 600 when used in conjunction with the present invention. In this case, when lever 900 is set in its upper position, the non-comparing master cards are conveyed to master card "receiver" pocket 25, and the comparing master cards are deflected to master card "eject" pocket 26. In this setting, all detail cards are conveyed to detail card "receiver" pocket 27. When lever 900 is set in its lower position, the non-comparing detail cards are conveyed to detail card "receiver" pocket 27, and the comparing detail cards are deflected to detail card "eject" pocket 28. In this setting, all master cards are conveyed to master card "receiver" pocket 25. When lever 900 is set in its intermediate position, the non-comparing master and detail cards are conveyed to their respective "receiver" pockets 25 and 27, and the comparing master and detail cards are deflected to their respective "eject" pockets 26 and 28. A detailed description of the manner in which these results are attained is deemed unnecessary in view of the foregoing description of the control exercised by cam 780 when set in its normal position, as shown in the drawings.

The manner in which sorting control cam 780, in either of its settings, may be selected for operation in conjunction with a punch control cam 770 and/or a machine stopping control cam 760 to obtain different types of card handling operations is completely disclosed in the cited application, and a list of the various combinational operations that may be effected by these cams is graphically illustrated in Fig. 74 thereof. In the same manner, punch control cam 770 and/or stopping control cam 760 may be selected for operation with sorting control cam 780 in conjunction with the mechanism of the present invention to increase the number of different combinational operations that may be obtained. A list of these operations is graphically illustrated in Figs. 8 and 8A. These figures include each of the operations that employ sorting control cam 780, as set forth in Fig. 74 of the cited application, and include the two additional operations that may be obtained, in each case, when lever 900 is set in its upper or lower position. For example, operation #1 of Fig. 8 illustrates the type of operation obtained when cam 780 alone is selected for operation, and lever 900 is set in its intermediate position. This operation, in which both the master and detail card deflector mechanisms are operated in accordance with the action of the comparing mechanism to segregate master and detail cards, corresponds to operation #1 of Fig. 74 of the cited application. Operations #1A and #1B illustrate the types of operation obtained when cam 780 alone is selected for operation, and lever 900 is set in its upper and lower position, respectively. In operation #1A only the master card deflector mechanism is operated in accordance with the action of the comparing mechanism to segregate the comparing master cards from the non-comparing master cards, whereas in operation #1B only the detail card deflector mechanism is operated to segregate the comparing detail cards from the non-comparing detail cards.

In view of the foregoing, the remainder of the chart is deemed self-explanatory. Operations 2, 7, 8, etc. correspond to the similarly numbered operations on Fig. 74 of the cited application. Operations 2A and 2B, 7A and 7B, 8A and 8B, etc., correspond to operations 2, 7, 8, etc. with regard to the selection and positioning of the operation control cams, but differ with regard to the setting of sorting control lever 900, whereby the sorting of master or detail cards is differentially controlled. As in the cited application, the reference characters designating the operation control cams have been enclosed in brackets to indicate that the control cam, in that type of operation, is offset relative to sleeve 600 of the control device.

Each of the operations listed in Figs. 8 and 8A, as in the case of the operations listed on Fig. 74 of the cited application, may be effected in conjunction with any one of the card feeding control cams or discs, described in the cited application, in accordance with the quantitative relationship of master and detail cards in a given card handling problem.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a machine for handling master and detail records, and including a comparing means for sensing comparisons or non-comparisons between perforation patterns is preselected portions of such records, the combination of separate record conveying means for passing master and detail records to respective receiving pockets, deflecting means associated with each of the conveying means, each of said deflecting means being arranged when operated to prevent the passing of records to their respective receiving pockets, means operable under the control of the comparing means to operate both of said deflecting means when a non-comparison is sensed, and means to dissociate either of said deflecting means from the control of the comparing means selectively.

2. In a machine for handling master and detail records, and including a comparing means for sensing comparisons or non-comparisons between perforation patterns in preselected portions of such records, the combination of separate record conveying means for passing master and detail records to respective receiving pockets, deflecting means associated with each of the conveying means, each of said deflecting means being arranged when operated to prevent the passing of records to their respective receiving pockets, means operable under the control of the comparing means to operate both of said deflecting means when a comparison is sensed, and means to dissociate either of said deflecting means from the control of the comparing means selectively.

3. In a machine for handling master and detail records, and including a comparing means for sensing comparisons or non-comparisons between perforation patterns in preselected portions of such records, the combinaion of separate record conveying means for passing master and detail records to respective receiving pockets, deflecting means associated with each of the conveying means, each of said deflecting means being arranged when operated to prevent the passing of records to their respective receiving pockets, individual operating means for each of the deflectors operable under control of the comparing means when a non-comparison is sensed, and means to place said operating means under control of the comparing means selectively or concomitantly.

4. In a machine for handling master and detail records, and including a comparing means for sensing comparisons or non-comparisons between perforation patterns in preselected portions of such records, the combination of separate record conveying means for passing master and detail records to respective receiving pockets, deflecting means associated with each of the conveying means, each of said deflecting means being arranged when operated to prevent the passing of records to their respective receiving pockets, individual operating means for each of the deflectors operable under control of the comparing means when a comparison is sensed, and means to place said operating means under control of the comparing means selectively or concomitantly.

5. In a machine for operating on master and detail records, including a comparing mechanism for sensing comparisons or non-comparisons between perforation patterns in preselected portions of such records and including means operable under the control of the comparing mechanism for transferring additional perforation patterns from the master records to the detail records, the combination of separate record conveying means for passing master and detail records to respective receiving pockets, deflecting means associated with each of the conveying means, each of said deflecting means being arranged when operated to prevent the passing of records to the respective receiving pockets, means operable under the control of the comparing mechanism to operate both of said deflecting means when a non-comparison is sensed, and means to dissociate either of said deflecting means from the control of the comparing mechanism selectively.

JOSEPH M. McDONNELL.